(12) United States Patent
Werker et al.

(10) Patent No.: US 11,415,351 B2
(45) Date of Patent: Aug. 16, 2022

(54) TOPOLOGY OF CONVERTER POWER SUPPLIES IN ELECTRICAL CLIMATE COMPRESSORS

(71) Applicant: Hanon Systems, Daejeon (KR)

(72) Inventors: Stephan Werker, Merzenich-Golzheim (DE); Stephen Newton, Ann Arbor, MI (US); Philipp Karutz, Cologne (DE)

(73) Assignee: HANON SYSTEMS, Daejeon (KR)

( * ) Notice: Subject to any disclaimer, the term of this patent is extended or adjusted under 35 U.S.C. 154(b) by 1361 days.

(21) Appl. No.: 15/648,138

(22) Filed: Jul. 12, 2017

(65) Prior Publication Data
US 2018/0017302 A1    Jan. 18, 2018

(30) Foreign Application Priority Data

Jul. 12, 2016 (DE) .......................... 102016212656.3

(51) Int. Cl.
| | |
|---|---|
| *F25B 49/02* | (2006.01) |
| *B60H 1/00* | (2006.01) |
| *H02P 27/06* | (2006.01) |
| *H02M 7/00* | (2006.01) |
| *B60H 1/32* | (2006.01) |

(Continued)

(52) U.S. Cl.
CPC ....... *F25B 49/022* (2013.01); *B60H 1/00421* (2013.01); *B60H 1/00428* (2013.01); *B60H 1/3222* (2013.01); *F25B 9/004* (2013.01); *F25B 9/006* (2013.01); *H02M 7/00* (2013.01); *H02P 9/02* (2013.01); *H02P 27/06* (2013.01);

(Continued)

(58) Field of Classification Search
CPC ..... G91S 3/7861; H02J 13/0003; H02J 3/383; H02J 3/385; H02J 3/38
See application file for complete search history.

(56) References Cited

U.S. PATENT DOCUMENTS 6,150,779 A * 11/2000 Itami ......................... H02P 6/20
                                                        318/722
6,211,719 B1 * 4/2001 deBrigard ............ H03K 17/785
                                                         326/30

(Continued)

FOREIGN PATENT DOCUMENTS

| EP | 2164162 A1 | 3/2010 |
|---|---|---|
| JP | 2000341974 A | 12/2000 |

(Continued)

*Primary Examiner* — Zoheb S Imtiaz
(74) *Attorney, Agent, or Firm* — McLean IP Global; Jason Y. Pahng

(57) ABSTRACT

The invention relates to an electric compressor control device comprising a low-voltage domain. The low-voltage domain comprises a first control unit set up to process control commands for the control of the electric compressor, and a first voltage supply set up to supply the first control unit and connected to a low-voltage source. The low-voltage domain comprises furthermore a high-voltage domain. The high-voltage domain comprises a second control unit set up to control a power output stage, wherein the power output state inverts a dc voltage from a high-voltage source into an ac voltage in order to supply a motor of the electric compressor with the ac voltage. The high-voltage domain comprises furthermore a second voltage supply set up to supply the second control unit and connected to the high-voltage source.

11 Claims, 7 Drawing Sheets

(51) Int. Cl.
    *F25B 9/00*     (2006.01)
    *H02P 9/02*     (2006.01)

(52) U.S. Cl.
    CPC ... *F25B 2600/021* (2013.01); *F25B 2600/024* (2013.01); *Y02T 10/88* (2013.01)

(56) References Cited

U.S. PATENT DOCUMENTS

| | | | | |
|---|---|---|---|---|
| 2001/0013761 | A1* | 8/2001 | Yoshida | H02M 7/48 318/400.21 |
| 2004/0085052 | A1 | 5/2004 | Itabashi et al. | |
| 2004/0222767 | A1* | 11/2004 | Ohkouchi | B60L 58/20 318/801 |
| 2005/0275386 | A1* | 12/2005 | Jepsen | H02M 7/4807 322/9 |
| 2010/0141233 | A1* | 6/2010 | Kwok | H04B 15/00 323/351 |
| 2010/0315024 | A1* | 12/2010 | Najima | H02M 7/53871 318/139 |
| 2011/0215639 | A1* | 9/2011 | Kurosaki | H04B 10/802 307/9.1 |
| 2013/0335004 | A1* | 12/2013 | Peuser | H02J 7/007 320/103 |
| 2015/0088384 | A1* | 3/2015 | Darraba | H02P 7/04 701/45 |

FOREIGN PATENT DOCUMENTS

| | | |
|---|---|---|
| JP | 2008043189 A | 2/2008 |
| JP | 2015162973 A | 9/2015 |

\* cited by examiner

Fig. 1 – Prior Art

TOPOLOGY OF CONVERTER POWER SUPPLIES IN ELECTRICAL CLIMATE COMPRESSORS

This application claims priority from German Patent Application No. 102016212656.3 filed on Jul. 12, 2016, which is hereby incorporated by reference in its entirety.

FIELD OF TECHNOLOGY

The present invention relates to a control device for an electric compressor that is employed, for example, in an air conditioner of a motor vehicle as a refrigerant compressor.

PRIOR ART

FIG. 1 shows a control device for an electric compressor 6 according to prior art as disclosed in EP 2 164 162 A1. The control device comprises two separate voltage domains separated against one another by an insulation barrier 13.

A low-voltage domain 11 is supplied with an on-board voltage from a battery 14. The low-voltage domain 11 comprises a microcontroller 8 carrying out communication with a control apparatus across a communication bus 7.

A high-voltage domain 12 is supplied with voltage from a high-voltage battery 1. The high-voltage domain 12 comprises an inverter 4 with switching elements 2, that supplies alternating voltage to an electric motor 5 of the electric compressor 6.

The high-voltage domain 12 comprises furthermore a microcontroller 10 that controls the inverter 4 and its gate driving circuit 3. The microcontroller 8 in the low-voltage domain 11 and the microcontroller 10 in the high-voltage domain 12 communicate across an optocoupler 9.

The microcontroller 10 in the high-voltage domain 12 is supplied with voltage from the low-voltage source 14 across a flyback transformer 15. The flyback transformer herein bridges the insulation barrier 13.

However, the use of a flyback transformer 15 in this environment presents problems since the flyback transformer 15 transmits switching interferences and other disadvantageous EMC (ElectroMagnetic Compatibility) interference signals from the high-voltage domain 12 into the low-voltage domain 11 and conversely. This is caused by the parasitic coupling capacitance of the transformer utilized in the flyback transformer 15 between the secondary and primary side. Especially the switching processes of the switching elements 2, which switch at high voltages and high currents, cause hereby interferences in the low-voltage domain 11. For that reason complex EMC countermeasures are necessary in order to ensure interference-free operation.

DESCRIPTION OF THE INVENTION

Against this background one problem addressed by the present invention is providing a control device for an electric compressor which reduces incompatible coupling between the high-voltage domain and the low-voltage domain.

This problem is resolved through the control device for an electric compressor according to claim 1. The dependent patent claims describe preferred embodiments.

Accordingly, the control device for an electric compressor comprises a low-voltage domain. The low-voltage domain comprises a first control unit set up to process control commands for the control of the electric compressor, and a first voltage supply set up to supply the first control unit and connected to a low-voltage source. The low-voltage domain comprises further a high-voltage domain. The high-voltage domain comprises a second control unit set up to control a power output stage, wherein the power output stage inverts a de voltage from a high-voltage source into an alternating voltage in order to supply a motor of the electric compressor with the alternating voltage. The high-voltage domain comprises furthermore a second voltage supply set up to supply the second control unit and connected to the high-voltage source.

The high-voltage domain and the low-voltage domain consequently comprise isolated voltage supplies. The two domains are thus galvanically completely isolated and the use of a flyback transformer across the insulation barrier can be avoided such that no interference effects can overcome the insulation barrier. The EMC is thus improved through this configuration.

According to an advantageous embodiment the high-voltage domain comprises further a start-up unit which is set up to start up the second voltage supply during a switch-on process of the control device.

According to an advantageous embodiment the second voltage supply comprises a switching regulator and the start-up unit limits a voltage rise at the switching regulator during the switch-on process.

According to an advantageous embodiment the high-voltage domain comprises further a discharge unit set up to discharge the high-voltage domain during a switch-off process of the control device.

According to an advantageous embodiment the high-voltage domain comprises further an overvoltage unit set up to switch off the second voltage supply should the voltage of the high-voltage source exceed a threshold value.

According to an advantageous embodiment the second voltage supply comprises a switching regulator with a pulse width modulation (PWM) control, and the overvoltage unit switches off the PWM control should the voltage of the high-voltage source exceed a threshold value.

According to an advantageous embodiment the high-voltage domain and the low-voltage domain are galvanically isolated, and the first control unit and the second control unit communicate with one another by means of an isolating communication interface.

According to an advantageous embodiment the first voltage supply and/or the second voltage supply comprise a switching regulator.

According to an advantageous embodiment the second voltage supply comprises one or several storage inductors, all of which are driven by a PWM control.

DESCRIPTION OF PREFERRED EMBODIMENTS

Preferred embodiments of the present invention will be described in detail in the following with reference to the accompanying drawing. Identical or corresponding elements are each provided with the same or similar reference numbers in the different Figures.

The preferred embodiments of the invention, which will be described in the following in detail, will be described in detail with reference to a control device for an electric compressor which serves as a refrigerant compressor in a motor vehicle. It should be noted, however, that the following description only contains examples and should not be viewed as limiting the invention.

Figure 1:
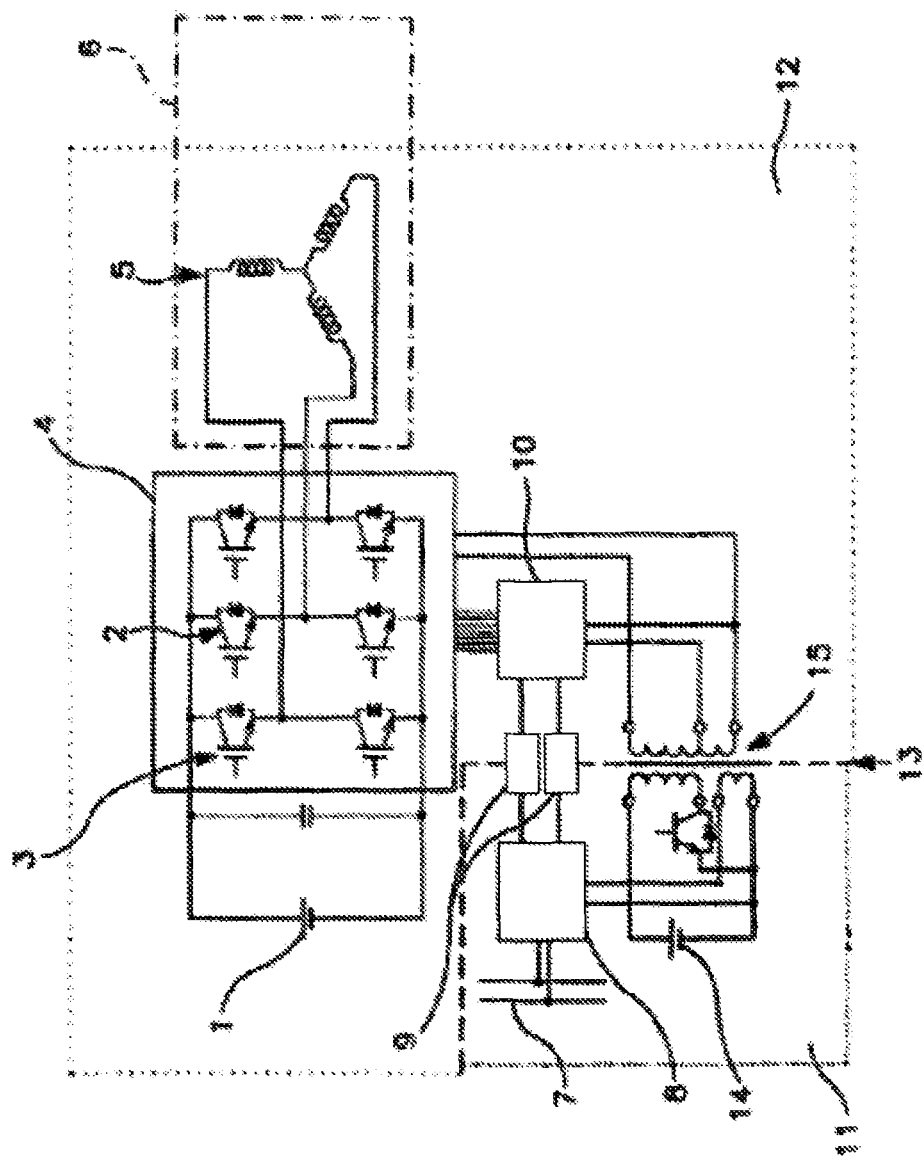
FIG. 1 shows an example of a control device for an electric compressor according to prior art.
Figure 2:
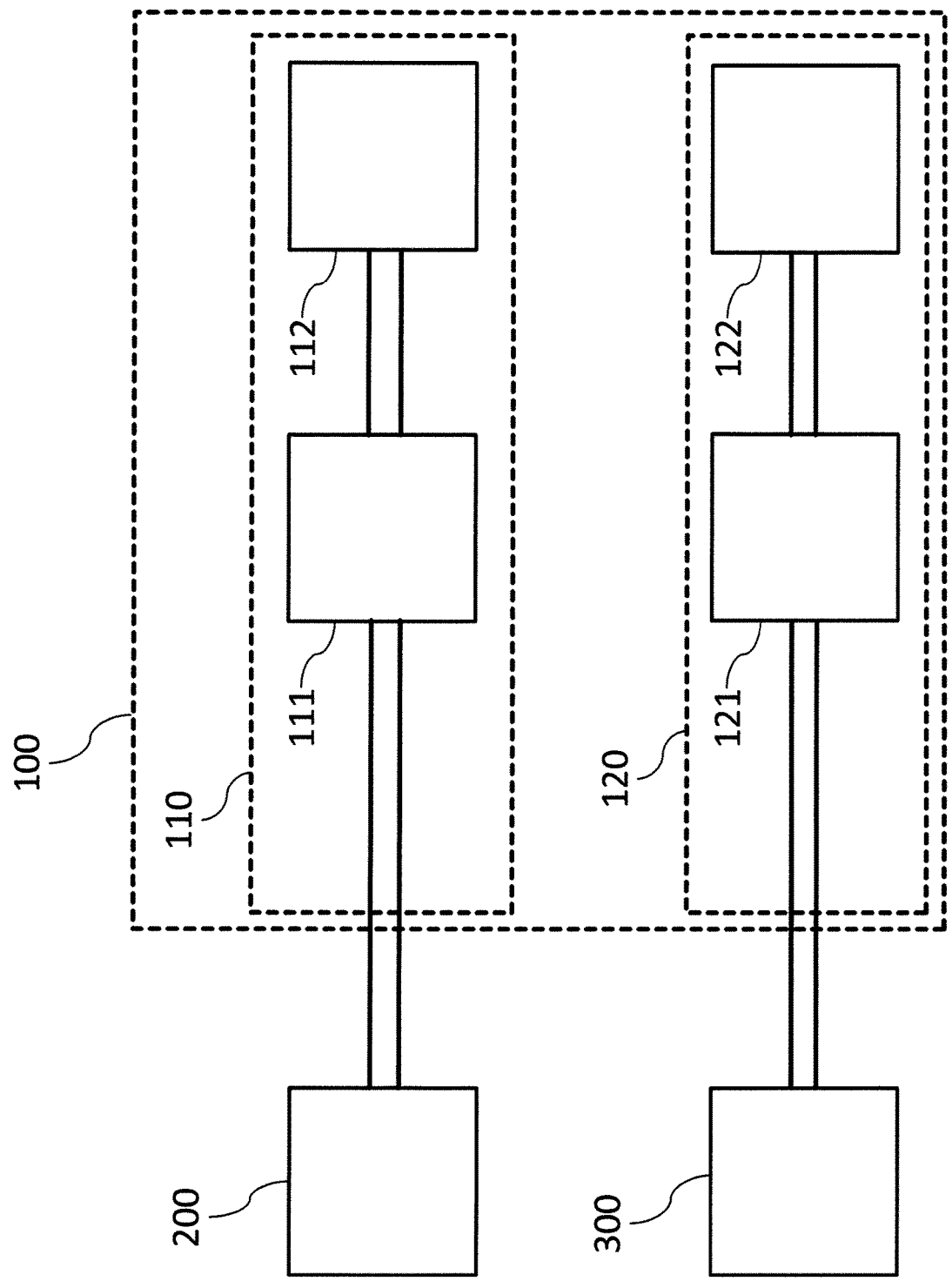
FIG. 2 shows an embodiment of a control device for an electric compressor according to the present invention.

FIG. 2 shows a first embodiment of a control device according to the present invention. The control device 100 comprises a low-voltage domain 120. The low-voltage domain 120 comprises a first control unit 122, set up to process control commands for the control of the electric compressor, and a first voltage supply 121, set up to supply the first control unit 122, and which (first control unit 122) is connected to a low-voltage source 300.

The first control unit 122 is preferably connected across a communication bus with a climate control unit and receives, for example, control commands for the control of the cooling capacity of the refrigerant compressor. The first control unit 122 can comprise microcontrollers (μCs), ICs, (temperature) sensors, etc., that must be supplied with constant voltage (for example 3.3 V or 5 V). The low-voltage source 300 provides to this end a dc voltage within a range of, for example, 6-36 V (in particular 12 V) for the voltage supply 121. The voltage supply 121 involves preferably a switching regulator SMPS (switched-mode power supply), which applies a constant voltage to the first control unit 122. In switching regulators a switching element (transistor, MOSFET) is driven with a pulse-width modulation (PWM) across an activation unit and commutates current in a storage inductor whereby different output voltages can be generated (see, for example, US 2004/0085052 A1).

The control unit 100 comprises further a high-voltage domain 110. The high-voltage domain 110 comprises a second control unit 112 set up to control a power output stage wherein the power output stage inverts a dc voltage from a high-voltage source 200 into an alternating voltage in order to supply a motor of the electric compressor with the alternating voltage.

The high-voltage source 200 can provide, for example, a dc voltage in the range of 150 V to 500 V. The high-voltage domain and the low-voltage domain are preferably located on the same circuit board and are isolated by an isolation barrier.

The power output stage comprises, for example, a B6 bridge equipped with semiconductor switches and corresponding control electronics. The control electronics comprises a gate drive circuit, which drives the gate terminals of the semiconductor switches (for example IGBTs) such that at the output of the B6 bridge an ac voltage is generated for the motor. It should be noted that the second control unit can comprise component parts with different input voltages. The gate drive circuit typically operates at a voltage of 17.5 V. The control electronics with μCs, ICs typically operates with lower voltages of 3.3 V or 5 V.

The high-voltage domain comprises further a second voltage supply 111 set up to supply the second control unit 122 and connected to the high-voltage source.

A control device according to the present invention consequently comprises isolated voltage supplies for the low- and the high-voltage domain. Thereby an galvanic isolation of the two voltage domains can be attained whereby no transmission of interferences between the high-voltage domain and the low-voltage domain is attained. In particular, the high-voltage domain 110 is exclusively supplied with voltage from the high-voltage source 200.

The control device can consequently operate more reliably.

In one embodiment the voltage supply 111 comprises a switching regulator which reduces and stabilizes the output voltage of the high-voltage source 200 to the voltage required by the second control unit 122. It is conceivable in this embodiment that the voltage supply 111 includes several storage inductors. However, it is advantageous in this case for all storage inductors to be driven by one (single) PWM control. Should several PWM controls be disposed in the high-voltage domain, the different PWM signals represent a considerable interference source. Stated differently, each PWM signal is to be considered an independent interference signal. It should furthermore be noted that in the presence of several storage inductors the relative spatial orientation of the storage inductors with respect to one another (orientation of the fringe magnetic fields) have a strong effect on the interference behavior. It is in particular important to avoid inductive coupling of the storage inductors. Through the driving via a common PWM control the inductive effect of the storage inductors is reduced.

Figure 3:
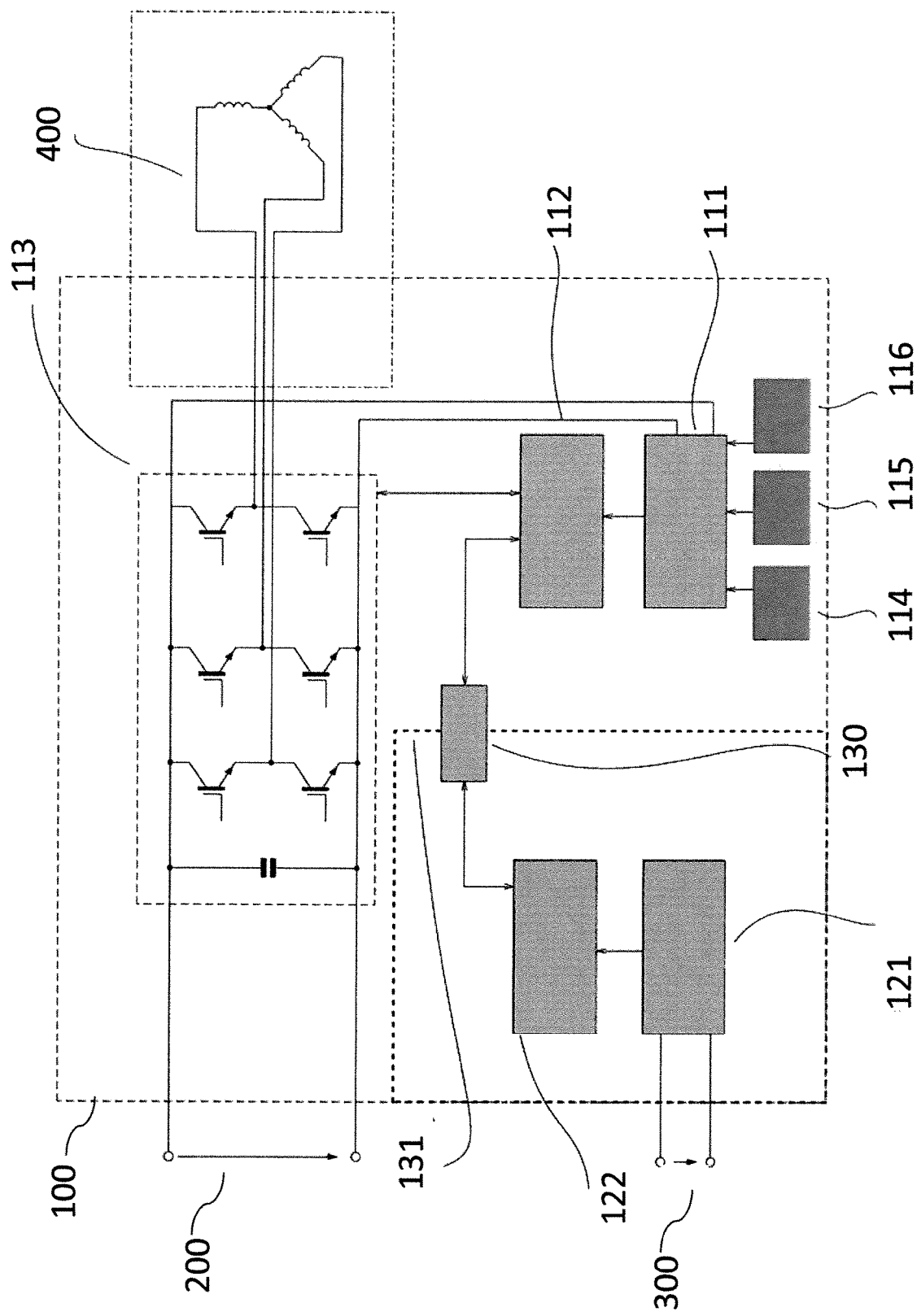
FIG. 3 shows a further embodiment of a control device according to the present invention.

FIG. 3 shows a further embodiment of a control device 100 according to the present invention. A dc voltage from a high-voltage source 200 is inverted through a power output stage 113 into an alternating voltage which supplies a motor 400 of an electric compressor.

The high-voltage domain and the low-voltage domain are galvanically isolated from one another through an isolation barrier 131. This means that the high-voltage domain and the low-voltage domain on a circuit board are separated from one another by a certain distance (for example 5 mm) and that no electrical conductors take course over this gap.

The high-voltage domain and the low-voltage domain are only connected with one another across a communication isolator (for example an optocoupler) 130. The first control unit 122 and the second control unit 112 can communicate with one another via the optocoupler 130.

The high-voltage domain 110 can further comprise a start-up unit 114 which is set up to start up the second voltage supply 111 during a switch-on process of the control device 100. Due to the isolated voltage supplies in the low-voltage domain and in the high-voltage domain, in the control device 100 according to the invention the problem arises, in particular, that the second voltage supply 111 must provide a constant output voltage of, for example, 55 to 600 V, when the control device 100 is being switched on at a constant output voltage of, for example, 3.3 V or 5 V. The start-up unit 114 provides such functionality.

Figure 4:
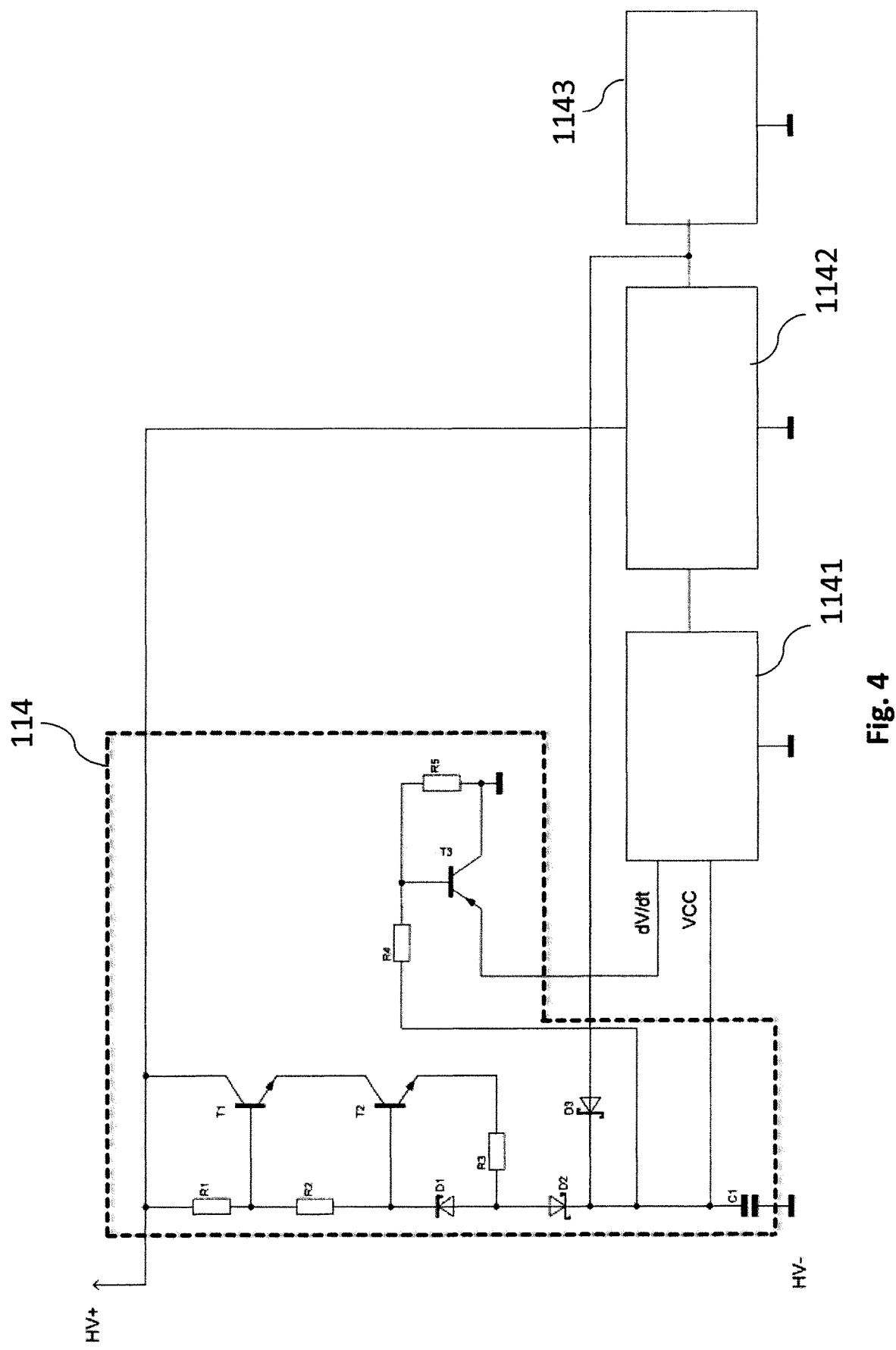
FIG. 4 shows an embodiment of a start-up unit according to the present invention.

FIG. 4 shows an embodiment of a start-up unit (power-up unit) 114 according to the present invention. The start-up unit 114 is supplied with voltage from the high-voltage source 200. The poles of the high-voltage source 200 are identified by HV+ and HV− in FIG. 4.

The load 1143 (for example the second control unit 112) is supplied with voltage by a commutation cell 1142 of a voltage inverter. The commutation cell comprises a switching element (transistor, MOSFET) and a storage inductor. The switching element is driven by a PWM control 1141.

When a voltage is applied at HV+ during a switch-on process of the control unit 100, the capacitor C1 is charged via the transistors T1 and T2. Herein R3 limits the charging current. Resistors R1, R2 as well as the Zener diode D2 set the voltage drop via T1 and T2. Therewith is attained that C1 is not charged above the voltage permissible for the PWM control 1141. In order for the voltage inverter not to start suddenly and generate dangerous overshoots of the output voltage at load 1143 during a switch-on process with high voltage, the circuitry about T3 limits the start rise time (dV/dt) of the output voltage. As soon as the voltage inverter runs, it supplies itself across diode D3 over its output voltage. Transistors T1 and T2 are no longer charged with current.

As is shown in FIG. 3 the high-voltage domain can comprise further a discharge unit 115 which is set up to discharge the high-voltage domain during a switch-off process of the control device 100. The discharge unit 115 can additionally be provided to, and independently of, the start-up unit 114. Due to the high voltages used in the high-voltage domain the intermediate circuit capacitors located in the high-voltage domain can be charged with high energy quantities even after a disconnection from the high-voltage source 200. This can lead to dangerous electric shocks.

Depending on the structure of the high-voltage domain, it may occur that the power consumption of the consumers, such as µCs, sensors, gate drivers, downstream of the voltage inverter is sufficient for a discharge of the high-voltage domain. For this it is necessary that the voltage inverter stays functional to below of voltage of, for example, 60 V and continues gating. Such discharge is necessary, for example, in the case of an emergency switch-off (case of fault, triggering of interlock).

Should this load of the consumers not be sufficient and a higher discharge current be necessary, the discharge unit 115 provides an automatic discharge functionality.

Figure 5:
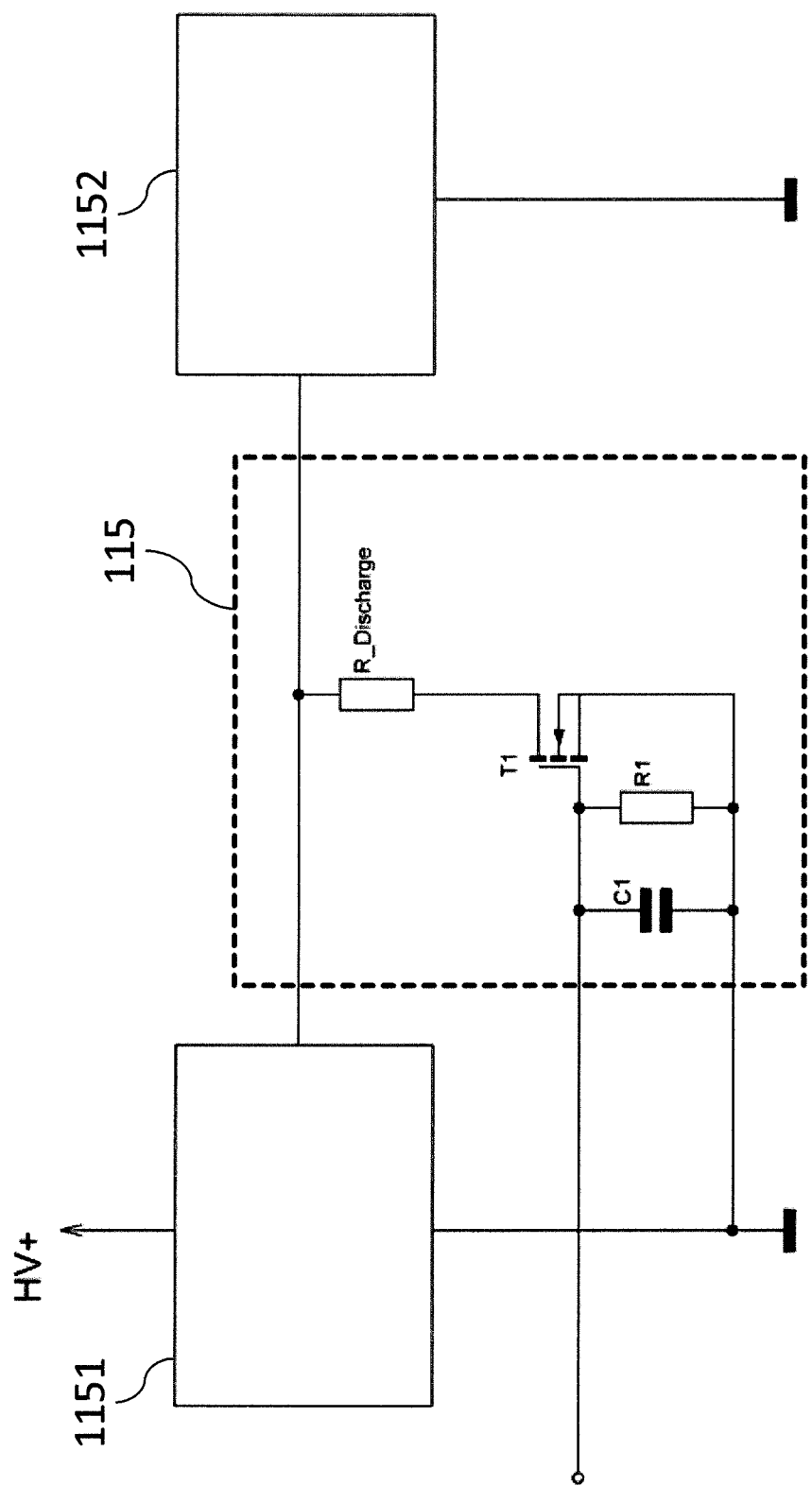
FIG. 5 shows an embodiment of a discharge unit according to the present invention.

FIG. 5 shows an embodiment of discharge unit 115 according to the present invention. The discharge unit 115 is connected to a switching regulator 1151 located in the second voltage supply 111. The discharge unit 115 is furthermore connected to a load 1152, such as, for example, the second control unit 112. Via a discharge signal applied to the gate terminal of the MOSFET T1 an additional load R_Discharge is connected. This discharge signal can originate, for example, from the µC (software function) or from a special interlock signal (safety signal of the motor vehicle).

As shown in FIG. 3, the high-voltage domain can furthermore comprise an overvoltage unit 116 which is set up to switch off the second voltage supply 111 in the event the voltage of the high-voltage source 200 exceeds a certain threshold value. By this, an overvoltage operation is avoided which could damage the high-voltage domain.

The overvoltage unit 116 can be provided in addition to, and independently of, the start-up unit 114 and/or of the discharge unit 115.

Figure 6:
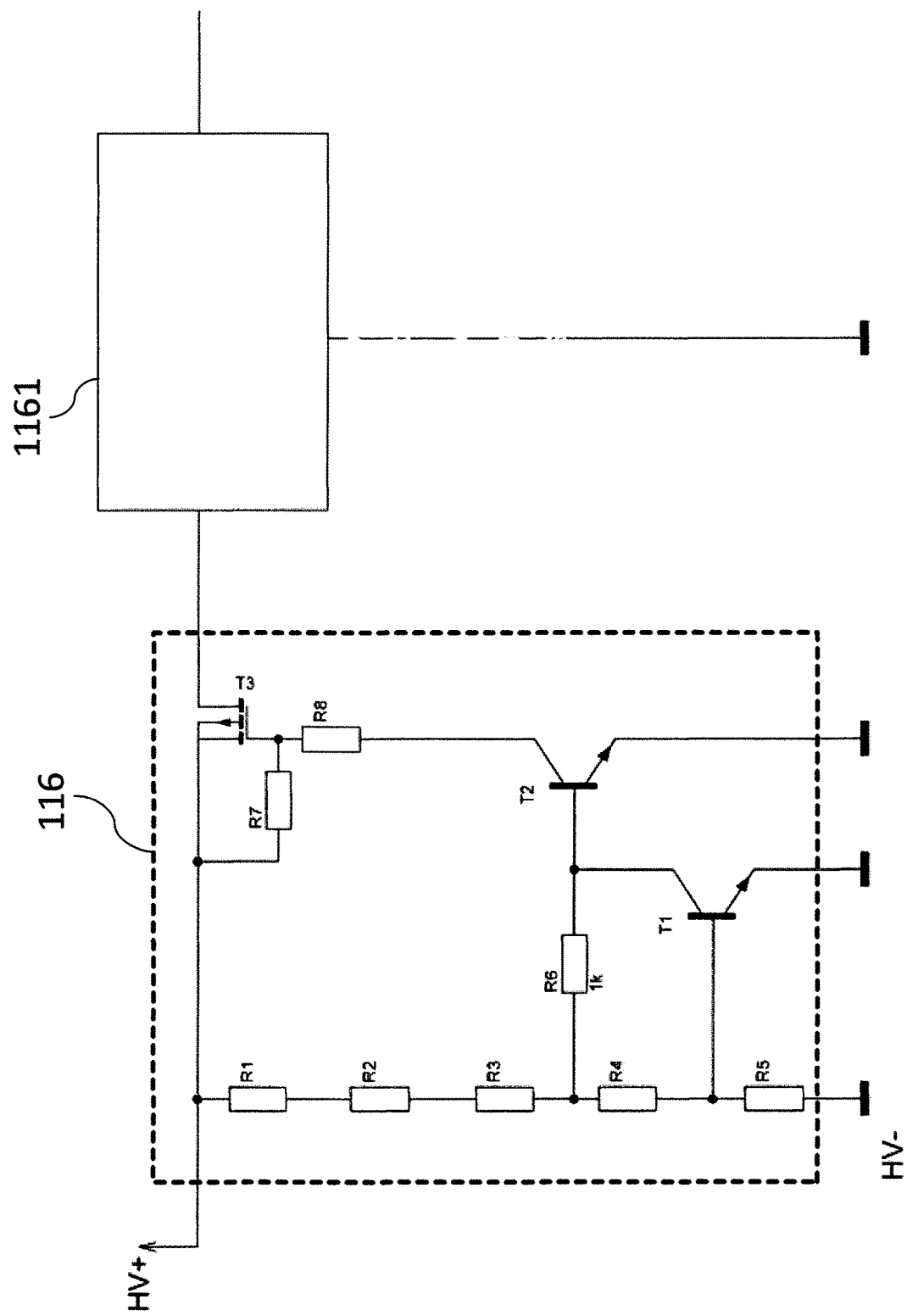
FIG. 6 shows an embodiment of an overvoltage unit according to the present invention.

FIG. 6 shows an embodiment of an overvoltage unit 116 according to the present invention. In an overvoltage switch-off the voltage dividers R1 to R5 activates a logic circuit comprised of T1 and T2. T2 controls the P channel MOSFET T3 and switches it off in the event of an overvoltage. The voltage regulator 1161 located in the second voltage supply 111 is hereby isolated from the high-voltage supply 200.

It is a disadvantage of the overvoltage unit shown in FIG. 6 that a high-voltage P channel MOSFET T3 is required. These semiconductors are highly complex in production for the high-voltage domain, are expensive and have relatively poor conductivity (R_DSon).

Figure 7:
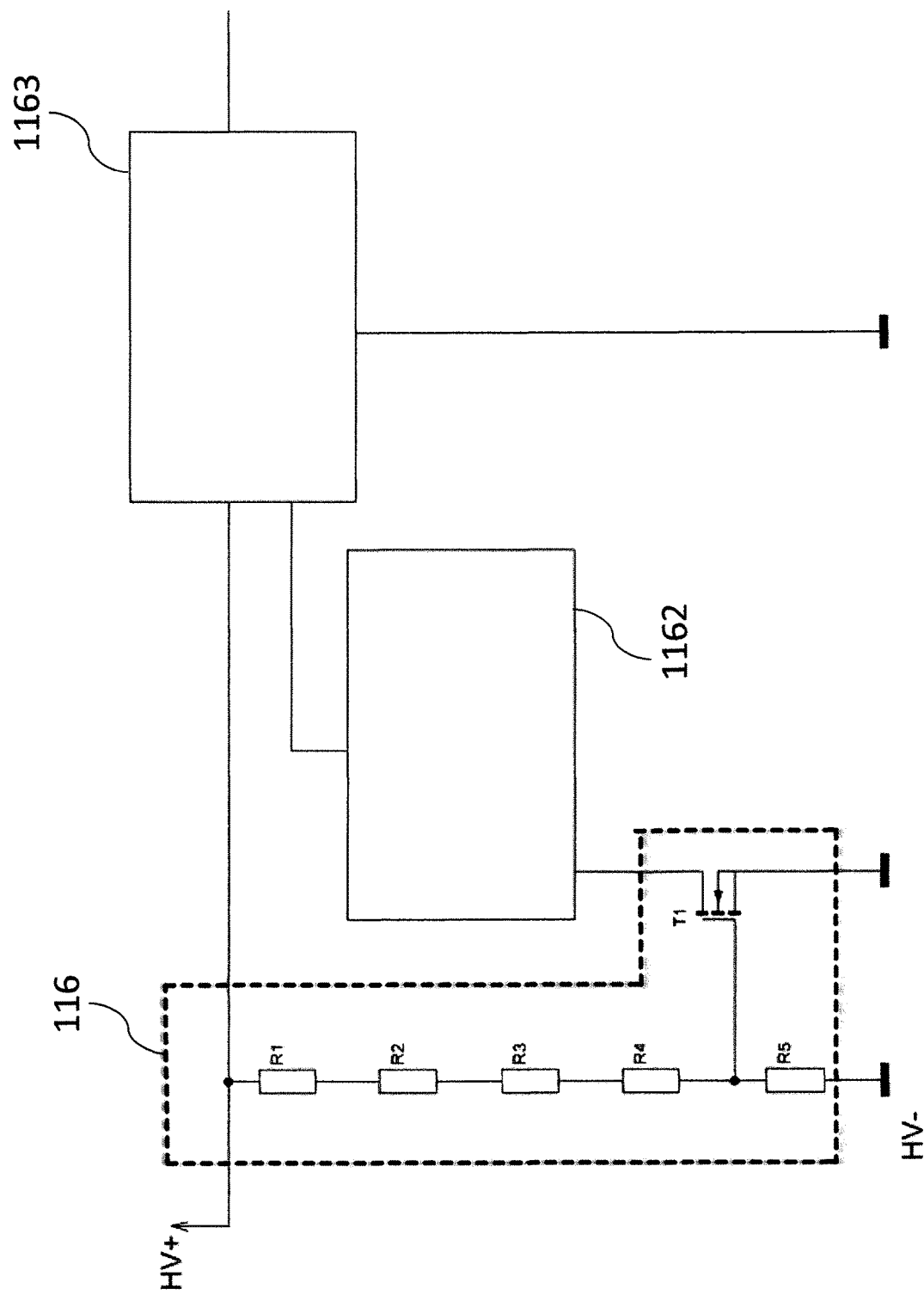
FIG. 7 shows a further embodiment of an overvoltage unit according to the present invention.

FIG. 7 shows a further embodiment of an overvoltage unit 116 according to the present invention which overcomes these disadvantages.

In this embodiment a voltage inverter with a switch-off function is utilized. The voltage dividers R1 to R5 controllingly increase the MOSFET T1 in the event of an overvoltage and activate the switch-off of the PWM control 1162 which drives the commutation cell 1163 of the voltage inverter located in the second voltage supply.

In a preferred embodiment a voltage hysteresis in the overcurrent switch-off is utilized. This can be realized through an appropriate transistor logic.

The invention claimed is:

1. A control device for an electric compressor, wherein the control device comprises:
    a low-voltage domain that comprises:
    a first control unit set un to process control commands for controlling the electric compressor and a first voltage supply set up to supply the first control unit and connected to a low-voltage source; and
    a high-voltage domain that comprises:
    a second control unit set up to control a power output stage, wherein the power output stage inverts a dc voltage from a high-voltage source into an ac voltage in order to supply a motor of the electric compressor with the ac voltage, and a second voltage supply set up to supply the second control unit and connected to the high-voltage source,
    wherein the high-voltage domain comprises furthermore a start-up unit set up to start up the second voltage supply during a switch-on process of the control device, wherein the second voltage supply comprises a switching regulator and the start-up unit limits a voltage rise at the switching regulator during the switch-on process, and
    wherein the high-voltage domain comprises furthermore an overvoltage unit set up to switch off the second voltage supply should the voltage of the high-voltage source exceed a threshold value.

2. The control device according to claim 1, wherein the high-voltage domain comprises furthermore a discharge unit set up to discharge the high-voltage domain during a switch-off process of the control device.

3. The control device as in claim 1, wherein the second voltage supply comprises a switching regulator with a PWM control and the overvoltage unit switches off the PWM control should the voltage of the high-voltage source exceed a threshold value.

4. The control device according to claim 1, wherein the high-voltage domain and the low-voltage domain are galvanically isolated and the first control unit and the second control unit are communicating with one another by means of an isolating communication interface.

5. A control device for an electric compressor, wherein the control device comprises:
    a low-voltage domain that comprises:
    a first control unit set up to process control commands for controlling the electric compressor and a first voltage supply set up to supply the first control unit and connected to a low-voltage source; and
    a high-voltage domain that comprises:
    a second control unit set up to control a power output stage, wherein the power output stage inverts a do voltage from a high-voltage source into an ac voltage in order to supply a motor of the electric compressor with the ac voltage, and a second voltage supply set up to supply the second control unit and connected to the high-voltage source, wherein the high-voltage domain comprises furthermore an overvoltage unit set up to switch off the second voltage supply should the voltage of the high-voltage source exceed a threshold value.

6. The control device according to claim 5, wherein the first voltage supply and/or the second voltage supply comprise or comprises a switching regulator.

7. The control device according to claim 5, wherein the second voltage supply comprises several storage inductors, all of which are driven by a PWM control.

8. An electric compressor with the control device according to claim 5.

9. The control device according to claim 5, wherein the high-voltage domain comprises furthermore a discharge unit set up to discharge the high-voltage domain during a switch-off process of the control device.

10. The control device as in claim 5, wherein the second voltage supply comprises a switching regulator with a PWM control and the overvoltage unit switches off the PWM control should the voltage of the high-voltage source exceed a threshold value.

11. The control device according to claim 5, wherein the high-voltage domain and the low-voltage domain are galvanically isolated and the first control unit and the second control unit are communicating with one another by means of an isolating communication interface.

* * * * *